United States Patent
Reuter et al.

(10) Patent No.: US 11,462,890 B2
(45) Date of Patent: Oct. 4, 2022

(54) ARRANGEMENT COMPRISING TWO SWITCH CABINET RACKS INTERCONNECTED BY MEANS OF A BAYING CONNECTOR

(71) Applicant: RITTAL GMBH & CO. KG, Herborn (DE)

(72) Inventors: Wolfgang Reuter, Liebenscheid (DE); Timo Schindler, Gladenbach (DE); Michael Hof, Haiger (DE)

(73) Assignee: RITTAL GMBH & CO. KG, Herborn (DE)

( * ) Notice: Subject to any disclaimer, the term of this patent is extended or adjusted under 35 U.S.C. 154(b) by 273 days.

(21) Appl. No.: 16/958,176

(22) PCT Filed: Dec. 17, 2018

(86) PCT No.: PCT/DE2018/101026
§ 371 (c)(1),
(2) Date: Jun. 26, 2020

(87) PCT Pub. No.: WO2019/149300
PCT Pub. Date: Aug. 8, 2019

(65) Prior Publication Data
US 2020/0366069 A1    Nov. 19, 2020

(30) Foreign Application Priority Data
Feb. 5, 2018    (DE) ...................... 20 2018 100 613.4

(51) Int. Cl.
*H02B 1/30* (2006.01)
*H02B 1/34* (2006.01)

(52) U.S. Cl.
CPC ............... *H02B 1/308* (2013.01); *H02B 1/34* (2013.01)

(58) Field of Classification Search
CPC ....................................................... H02B 1/308
See application file for complete search history.

(56) References Cited

U.S. PATENT DOCUMENTS

| 4,643,319 | A |   | 2/1987 | Debus et al. |   |
|---|---|---|---|---|---|
| 5,039,177 | A | * | 8/1991 | Newell | A47B 87/008 52/287.1 |

(Continued)

FOREIGN PATENT DOCUMENTS

| CH | 644718 A5 * | 8/1984 | ............. H02B 1/308 |
|---|---|---|---|
| CN | 1181159 A | 5/1998 | |

(Continued)

OTHER PUBLICATIONS

International Search Report (in English and German) and Written Opinion of the ISA (in German) issued in PCT/DE2018/101026, dated Feb. 26, 2019; ISA/EP.

(Continued)

*Primary Examiner* — Robert J Hoffberg
(74) *Attorney, Agent, or Firm* — Harness, Dickey & Pierce, P.L.C.

(57) ABSTRACT

The invention relates to an arrangement, which comprises two switch cabinet racks interconnected by means of a baying connector, the switch cabinet racks each having a profile web, which lie in a first common plane and by means of which the switch cabinet racks adjoin each other, and wherein the switch cabinet racks each have a mounting side which lie in a second common plane and face an interior space of the interconnected switch cabinet racks each, the first and the second plane extending parallel to one another and being spaced apart from one another, wherein the baying connector is completely arranged between the first and the second plane.

14 Claims, 2 Drawing Sheets

(56) References Cited

U.S. PATENT DOCUMENTS

Figure 1:
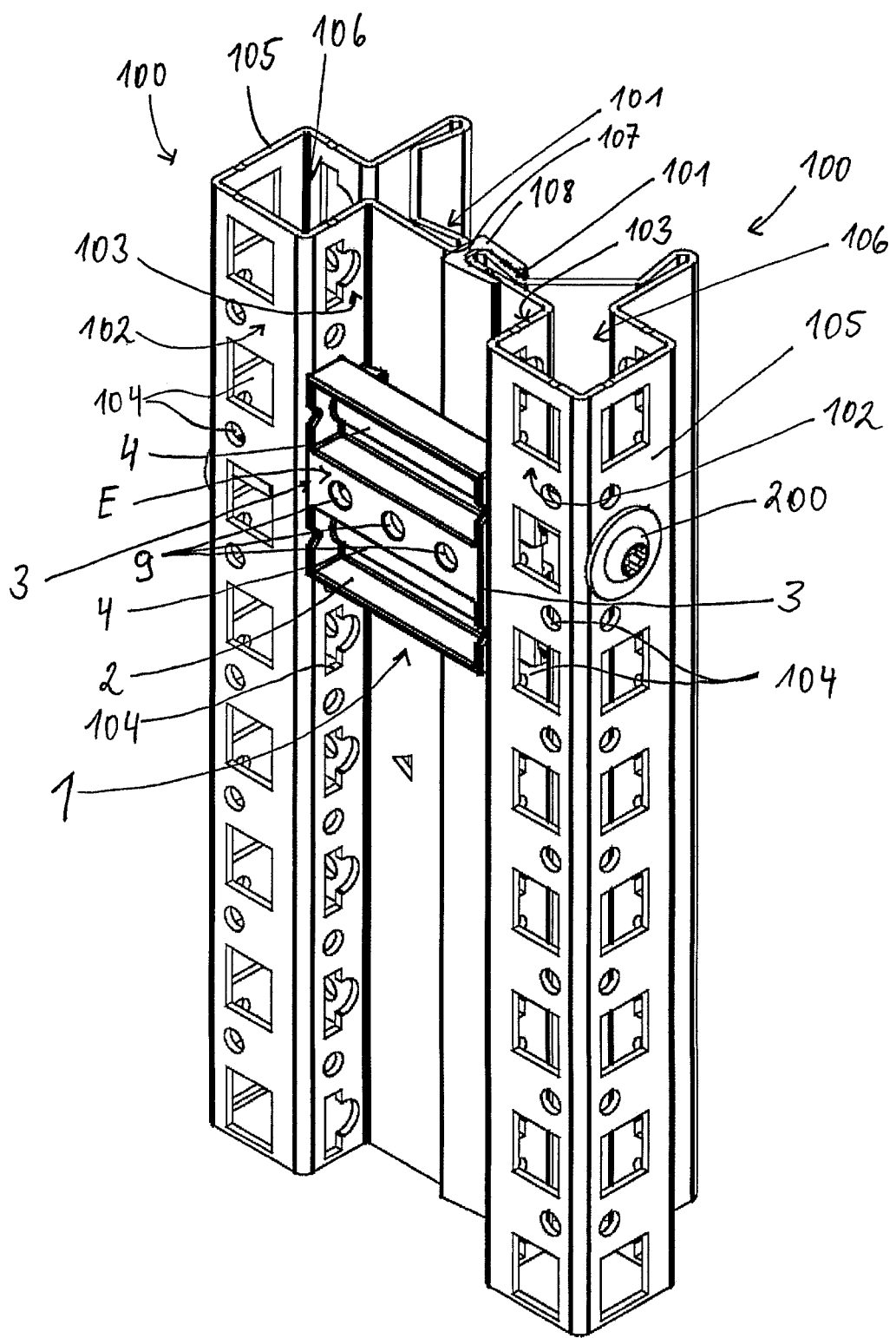

| | | | |
|---|---|---|---|
| 6,164,985 A | 12/2000 | Reuter | |
| 6,312,068 B1 * | 11/2001 | Benner | H02B 1/308 |
| | | | 312/265.5 |
| 6,435,759 B1 * | 8/2002 | Root | H02B 1/301 |
| | | | 403/353 |
| 6,575,657 B1 | 6/2003 | Reuter et al. | |
| 6,615,998 B2 * | 9/2003 | Klassen | H02B 1/38 |
| | | | 211/183 |
| 8,926,030 B2 * | 1/2015 | Roth | H02B 1/01 |
| | | | 312/111 |
| 9,871,353 B2 | 1/2018 | Boehme et al. | |
| 9,991,684 B2 | 6/2018 | Brueck et al. | |
| 10,024,348 B2 | 7/2018 | Schindler | |
| 10,277,014 B2 | 4/2019 | Brueck et al. | |
| 10,396,531 B2 | 8/2019 | Reuter et al. | |
| 10,483,724 B2 | 11/2019 | Reuter | |
| 10,601,205 B2 | 3/2020 | Reuter et al. | |
| 2001/0050516 A1 | 12/2001 | Minoura et al. | |
| 2016/0352080 A1 | 12/2016 | Brueck et al. | |
| 2016/0352082 A1 | 12/2016 | Boehme et al. | |
| 2016/0352083 A1 | 12/2016 | Brueck et al. | |
| 2016/0363150 A1 | 12/2016 | Schindler | |
| 2018/0375302 A1 | 12/2018 | Reuter et al. | |
| 2019/0157847 A1 | 5/2019 | Reuter | |
| 2019/0214798 A1 | 7/2019 | Schindler et al. | |
| 2019/0252866 A1 | 8/2019 | Reuter et al. | |
| 2019/0257125 A1 | 8/2019 | Bloh et al. | |

FOREIGN PATENT DOCUMENTS

| | | | | |
|---|---|---|---|---|
| CN | 109066370 A | * | 12/2018 | ............ H02B 1/308 |
| DE | 19512380 A1 | * | 10/1995 | ............ H02B 1/308 |
| DE | 29723544 U1 | | 1/1999 | |
| DE | 10157979 C1 | * | 4/2003 | ............ H02B 1/308 |
| DE | 102008034775 A1 | | 2/2009 | |
| DE | 102016015791 A1 | * | 6/2018 | ............ H02B 1/308 |
| EP | 0189061 A1 | * | 7/1986 | ............ A47B 87/008 |
| EP | 0844708 A1 | * | 5/1998 | ............ H02B 1/308 |
| EP | 0874434 A2 | * | 10/1998 | ............ H02B 1/308 |
| EP | 1248340 A1 | * | 10/2002 | ............ H02B 1/308 |
| EP | 1601074 A1 | | 11/2005 | |
| EP | 3070796 A1 | * | 9/2016 | ............ H02B 1/012 |
| EP | 3171468 A1 | * | 5/2017 | ............ H02B 1/308 |
| FR | 2708391 A1 | * | 2/1995 | ............ H02B 1/01 |
| JP | S60-148306 A | | 8/1985 | |
| JP | H06339204 A | * | 6/1994 | ............ H02B 1/308 |
| JP | H11-127507 A | | 5/1999 | |
| WO | WO-2004114483 A1 | * | 12/2004 | ............ H02B 1/301 |

OTHER PUBLICATIONS

International Preliminary Report on Patentability (in German) issued in PCT/DE2018/101026, dated Jan. 20, 2020.

* cited by examiner

ARRANGEMENT COMPRISING TWO SWITCH CABINET RACKS INTERCONNECTED BY MEANS OF A BAYING CONNECTOR

CROSS-REFERENCE TO RELATED APPLICATIONS

This application is a 371 U.S. National Phase of International Application No. PCT/DE2018/101026, filed on Dec. 17, 2018, which claims the benefit of German Application No. 20 2018 100 613.4, filed on Feb. 5, 2018. The entire disclosures of the above applications are incorporated herein by reference.

BACKGROUND

This section provides background information related to the present disclosure which is not necessarily prior art.

TECHNICAL FIELD

The invention relates to an arrangement, which comprises two switch cabinet racks interconnected by means of a baying connector, the switch cabinet racks each having a profile web, which lie in a first common plane and by means of which the switch cabinet racks adjoin each other. The switch cabinet racks each have a mounting side which lie in a second common plane and face an interior space of the interconnected switch cabinet racks each, the first and the second plane extending parallel to one another and being spaced apart from one another. Such an arrangement is known from DE 10 2014 101 401 A1.

DISCUSSION

The arrangements known from prior art have the disadvantage that the baying connector is arranged outside the sealing area of the bayed switch cabinet racks and is therefore accessible from the outside of the arrangement and thus not protected against sabotage. Furthermore, baying connectors are known which are mounted from the inside of the switch cabinet racks, but then extend into the installation clearance of the switch cabinet arrangement and thus render the valuable installation space inside the switch cabinet racks partially unusable.

SUMMARY

This section provides a general summary of the disclosure, and is not a comprehensive disclosure of its full scope or all of its features.

It is thereforeone aspect of the invention to further develop an arrangement of the kind described above in such a way that it is sabotage-proof on the one hand and space-saving on the other.

Accordingly, it is provided that the baying connector is completely arranged between the first and the second plane. This achieves that the baying connector is both facing the interior of the switch cabinet racks and is otherwise still arranged behind a rearmost mounting plane of the switch cabinet racks, which lies in the second common plane of the mounting sides of the switch cabinet racks, and thus does not restrict the installation space inside the switch cabinet racks.

The baying connector may have a body with opposite contact sides, with which it rests against a further profile side each, which extends between the first and second planes and perpendicular to them. In particular, it may be provided that the further profile side connects the mounting side with the profile web. The mounting side can be bent from the further profile side by a 90° bent edge. Likewise, the profile web can be bent from the other profile side by means of a 90° bent edge. In particular, the mounting side and the profile web can be bent in opposite directions from the further profile side. The profile web and the mounting side can be spaced apart from each other by a dimension of the further profile side that extends perpendicular to the profile web and the mounting side. The other side of the profile can have a system perforation consisting of regularly spaced fastening apertures. In particular, the switch cabinet rack can be made of circumferential identical profiles. A suitable switch cabinet rack is known from DE 10 2015 121 192 A1.

At least one screw passage can extend over the entire length of the baying connector between the contact sides and through the contact sides. In particular, it can be provided that the screw channel is formed continuously over the entire length between the contact sides, i.e. without interruptions, in order to achieve precise guidance of a screw bolt.

The baying connector may also have at least one centering pin extending from at least one of the contact sides and perpendicular to it. The centering pin can have, in particular on its outer circumference, a contour which corresponds to the contour of an opening or fastening aperture through the further profile side of the switch cabinet rack. In particular, the centering pin can be accommodated form-fittingly in the opening or fastening aperture. The centering pin can be positioned in relation to the at least one screw passage in such a way that a defined alignment of the screw passages of the baying connector with respect to further openings in the further profile side is achieved, so that the screw passages are aligned with the openings for the insertion of a screw bolt.

At least one latching projection can extend from at least one of the contact sides through a fastening aperture in one of the further profile sides and fix the baying connector to the further profile side, in particular latch it. The fastening apertures can be part of a system perforation of the further profile side. The system perforation can have fastening apertures which extend along a straight line with a fixed grid dimension. Several latching projections may extend from at least one of the contact sides, the latching projections having a distance from each other which corresponds to an integral multiple of the grid dimension. A suitable system perforation is described in DE 10 2015 121 192 A1.

The latching projection may have a sliding surface which extends from one of the contact sides and perpendicularly to it and which is arranged opposite a hook of the latching projection, the sliding surface bearing form-fittingly against an edge of the fastening aperture through which the latching projection extends.

At least one screw passage may extend over the entire length of the baying connector between the contact sides and through the contact sides, the at least one screw passage being aligned with the at least one latching projection and continued through the latching projection.

A screw bolt can be passed through a closed profile section of the switch cabinet rack from an outer profile side of the switch cabinet rack, which is arranged parallel to and spaced apart from the further profile side. For this purpose, the switch cabinet rack can again have a geometry as known from DE 10 2015 121 192 A1.

The screw bolt can enter the closed profile section via an outer profile side and exit the closed profile section via the further profile side and enter the baying connector via one of two opposite contact sides of the baying connector.

In this case, the screw bolt can have an external thread at least in an end section facing away from the screw bolt head, with which it is screwed into the at least one screw passage, which has an internal thread.

The screw bolt can bear against the outer profile side with a screw bolt head.

The baying connector may have a mounting side with a row of holes of equidistantly spaced fastening apertures lying in or extending through the second common plane of the mounting side.

In that case, the fastening apertures can have a distance to each other which corresponds to the grid dimension of a system perforation of the switch cabinet rack.

The fastening apertures of the baying connector may be arranged along a linear row of holes and may be formed identical to fastening apertures of the system perforation, wherein the fastening apertures of the baying connector and at least one identical fastening aperture of the system perforation are arranged along a straight line, a distance between each of the fastening apertures of the baying connector and the at least one fastening aperture of the system perforation being an integer multiple of the grid dimension.

The profile webs can adjoin each other under formation of a sealing gap and can be formed as identical sealing webs widening towards their free end, wherein a push-on seal is pushed onto one of the sealing webs, which push-on seal seals the sealing gap fluid-tight.

The contact sides of the baying connector can have a spacing that is slightly greater than the sum of the length of the profile webs, wherein the push-on seal has a defined compression when the further profile sides abut the opposite contact sides of the baying connector.

For fastening the racks to each other, the centering pin can be used to position the baying connector on a first of the two racks to be connected to each other, e.g. on a first vertical profile of the rack, so that two threaded bolts inserted via the outer profile side and formed as shaft screws can be screwed into the screw passages of the baying connector. Thus, the baying connector is fixed to the first of the two racks.

Then, the second of the two racks can be lined up with the first rack by pushing the two latching projections of the baying connector into a fastening aperture each.

When the latching projections lengthen the screw passages, they have the function of an insertion aid for further screw bolts, which are inserted via the outer profile side of the second rack. The latching projections can extend into the closed profile section by a dimension for this purpose. This dimension can be adjusted according to the distance between the outer profile side and the further profile side in such a way that sufficient guidance of the screw bolt is ensured for easy fastening of the second rack to the baying connector.

The centering pin can have a length perpendicular to the contact side from which it extends, which is dimensioned in such a way that the baying connector can also be retrofitted, i.e. when the racks are close to each other in the baying situation, the other baying connectors that may be present are pre-assembled via their screw bolts, but the bolts have not yet been tightened, so that the sealing element is not yet compressed and there is therefore sufficient space for inserting the baying connector between the further profile sides facing each other.

This can be further facilitated by the latching projections being form-fittingly accommodated in the fastening apertures in only one dimension. In the dimension parallel to the fastening apertures, the latching projections can be smaller than the fastening apertures, so that the latching projections can be rotated into the fastening apertures by means of a rotary movement in the plane perpendicular to the plane of the fastening apertures.

Adjacent to its bolt head, the shaft of the fastening bolt may have a diameter corresponding to a distance between opposite sides of the fastening aperture in the outer profile side via which the fastening bolt is inserted into the rack. This widened shaft section does not extend to the further profile side, but only serves as a support for easier positioning of the fastening bolt in the fastening aperture, which can be a rectangular hole, on the outer profile side.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
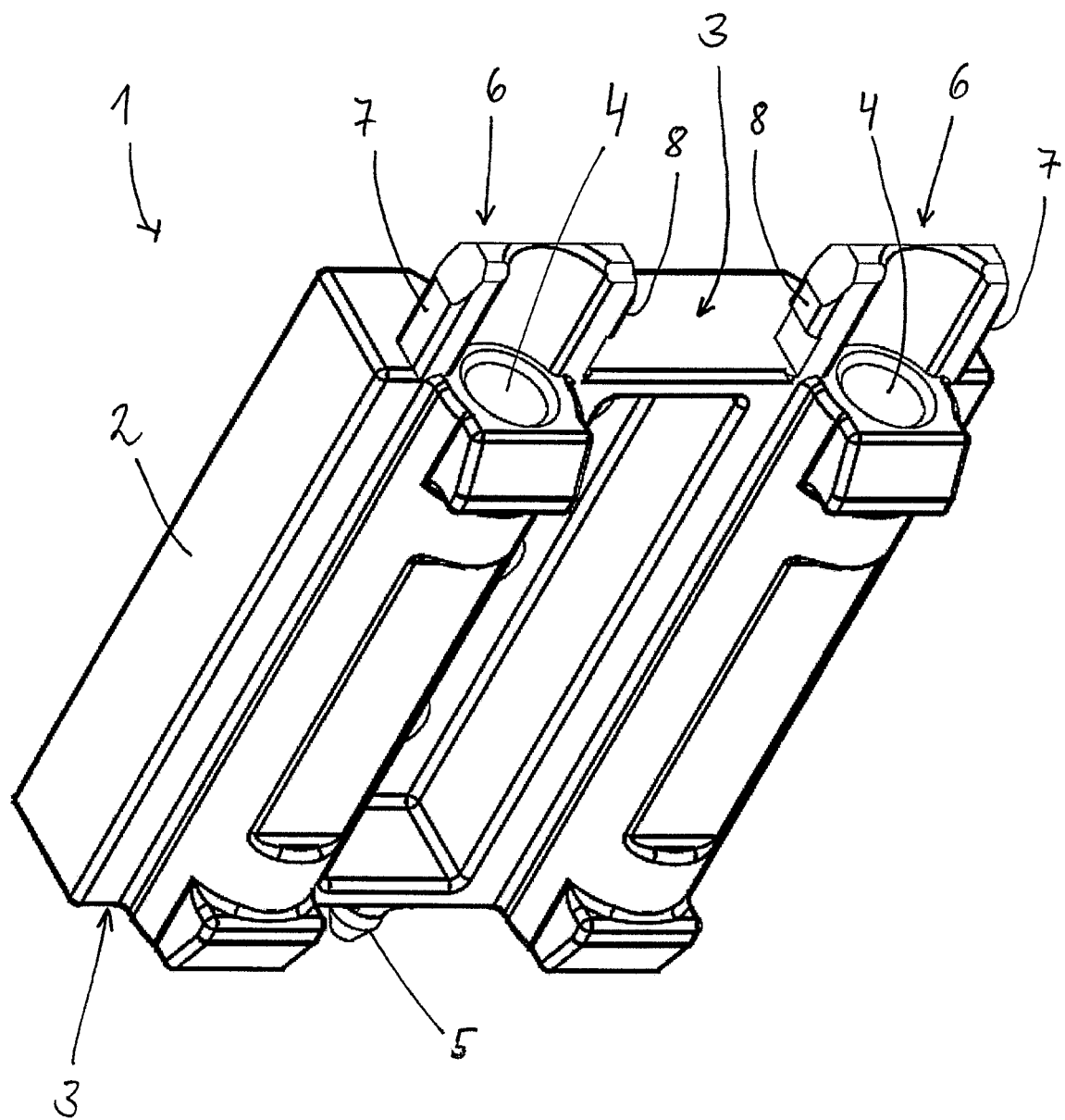

Further details of the invention are explained with the following figures. These show:

FIG. 1 in perspective view, a view of the inside of an arrangement according to the invention according to an embodiment of the invention; and FIG. 2 a detailed view of the baying connector according to FIG. 1.

DETAILED DESCRIPTION

Example embodiments will now be described more fully with reference to the accompanying drawings.

In FIGS. 1 and 2 an embodiment of the arrangement according to the invention is shown. In this case, two switch cabinet racks 100 are interconnected at their side facing the interior of the switch cabinet racks 100, i.e. towards the installation space of the switch cabinet racks 100, by means of a baying connector 1. The switch cabinet racks 100 adjoin each other via opposing profile webs 101, which are arranged in a first common plane. The profile webs 101 are formed as sealing webs with a sealing element 8 arranged between them, so that the first common plane forms a sealing plane of the arrangement. Consequently, the baying connector 1 is protected from external environmental influences and access via the sealing plane.

Baying connector 1 is arranged particularly between the previously described sealing plane and a second common plane of the mounting sides 102 of the switch cabinet racks in a space-saving manner. The second common plane, which is defined by the mounting sides 102, is precisely the rearmost mounting plane of the switch cabinet racks 100. Since the baying connector 1 is located completely behind the mounting plane formed by the second common plane or its front side is located exactly in the second common plane, respectively, the baying connector 1 is arranged in a space-saving manner and in particular can also be superposed without the component superposing the baying connector 1 colliding with the baying connector 1.

The switch cabinet rack 100 is formed according to the switch cabinet rack known from DE 10 2015 121 192 A1. Each of the interconnected switch cabinet racks 100 has a further profile side 103, which connects the respective mounting side 102 with the respective profile web 101 via a 90° bent edge. Opposite the further profile side 103, an outer profile side 105 is bent from the mounting side 102 via a further 90° bent edge from the mounting side 102. Via the outer profile side 105, a screw bolt 200 is passed through a closed profile section 106 of the switch cabinet rack 100 up to where the bolt 200 leaves the closed profile section 106 via the further profile side 103 and enters there directly with its free end into one of the screw passages 4 of the baying connector 1. The screw passages 4 have an internal thread so that a force-fit connection can be made between the switch cabinet rack 100 and baying connector 1. A defined compression of the push-on seal 108 is achieved with the screw connection in such a way that the length of the baying connector 1, i.e. the distance between the contact sides 3 of the baying connector 1 is dimensioned such that a defined sealing gap 107 is formed between the free ends of the sealing webs 103 when the baying connector 1 rests via its opposite contact side 3 against the further profile sides 103 of the switch cabinet racks 100.

Baying connector 1 also has a mounting plane E with a system perforation of circular fastening apertures 9 spaced at a grid dimension. The fastening apertures 9 of the baying connector 1 are arranged along a straight line and have a distance to further, identical fastening apertures 104 of the mounting sides 102 of the switch cabinet racks 100, which lie on the same straight line, which corresponds to an integral multiple of the grid dimension. Expediently, the grid dimension of the fastening apertures 9 of the baying connector 1 has precisely a value that corresponds to the grid dimension of the fastening apertures 104 of the switch cabinet racks 100, so that the grid dimension of the switch cabinet racks 100 is also maintained across the mounting plane E of the baying connector 1 and thus across the adjacent switch cabinet racks 100. This has the advantage that installation components whose fastening means are designed to be fixed to a system perforation of switch cabinet racks 100 can also be mounted across adjacent switch cabinet racks 100. For example, a switch cabinet light may extend between adjacent switch cabinet racks 100 of the arrangement and be fastened with a first of its opposite ends in a first of the switch cabinet racks 100 and with a second of its opposite ends in a second of the switch cabinet racks 100 adjacent to the first switch cabinet rack 100 and fixed by means of the baying connector 1.

As can be seen in FIG. 2, the baying connector 1 essentially consists of a body 2 which has opposite contact sides 3. Screw passages 4 extend perpendicularly to the contact sides 3 over the entire distance between the contact sides 3, so that continuous guidance of a screw bolt 200 (see FIG. 1) between the contact sides 3 is ensured. Latching projections 6 extend from the contact sides 3 and are aligned with the screw passages 4, so that the screw passages 4 continue through the latching projections 6. On opposite sides, which extend perpendicularly to the respective contact side 3, the latching projections 6 have a sliding surface 7 and a hook 8 opposite this sliding surface. Hook 8 is configured to engage behind a fastening aperture 104 (see FIG. 1) in the edge area in a mounted state of baying connector 1, thus simplifying the mounting of baying connector 1.

On the further contact side 3, which is arranged opposite the contact side 3 with the latching projections 6, a centering pin 5 is formed, which extends perpendicularly to the further contact side 3 and has a contour on its outer circumference which corresponds to an inner contour of a fastening aperture 104 of the further profile side 103 (see FIG. 1). The centering pin 5 is used in particular for pre-aligning the screw passages 4 in relation to the further fastening apertures 104 in the further profile side 103.

When fastening the racks 100 to each other, the centering pin 5 can be used to position the baying connector 1 on a first of the two racks 100 to be connected to each other, for example on a first vertical profile of the rack 100, so that two threaded bolts 200 inserted via the outer profile side 105 and formed as shaft screws can be screwed into the screw passages 4 of the baying connector 1, so that the baying connector 1 is fixed to the first of the two racks 100.

The second of the two racks 100 can then be lined up with the first rack 100 by pushing the two latching projections 6 of the baying connector 1 into a fastening aperture 104 each. Since the latching projections 6 lengthen the screw passages 4, they have the function of an insertion aid for further screw bolts, which are inserted via the outer profile side 105 of the second rack 100. For this purpose, the latching projections extend by a dimension into the closed profile section, wherein the dimension is adjusted according to the distance between the outer profile side 105 and the further profile side 103 in such a way that sufficient guidance of the screw bolt is ensured for easy fastening of the second rack 100 to the baying connector 1.

The centering pin 5 has a length perpendicular to the contact side 3 from which it extends, which is dimensioned so that baying connector 1 can also be retrofitted when the racks 100 are close to each other in the baying situation, but the other baying connectors 1, which may be present, are pre-assembled via their bolts 200, but these bolts are not yet tightened, so that the sealing element 108 is not yet compressed and there is therefore sufficient space for inserting the baying connector between the further profile sides 103 facing each other. This is further facilitated by the latching projections 6 being form-fittingly accommodated in the fastening apertures 104 in only one dimension. In the dimension parallel to the fastening apertures 104, the latching projections 6 are smaller than the fastening apertures 104, so that the latching projections 6 can be rotated into the fastening apertures 104 via a rotary movement in the plane perpendicular to the plane of the fastening apertures 104.

Adjacent to its bolt head, the shaft of the fastening bolt 200 may have a diameter corresponding to a distance between opposite sides of the fastening aperture 104 in the outer profile side 105 via which the fastening bolt 200 is inserted into the rack. This widened shaft section does not extend to the further profile side 103, but only serves as a support in the rectangular hole of the outer profile side 105 for easier positioning of the fastening bolt 200.

The features of the invention disclosed in the above description, drawings and claims may be essential for the realization of the invention either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An arrangement, which comprises two switch cabinet racks interconnected by means of a baying connector, the switch cabinet racks each having a profile web, which lie in a first common plane and by means of which the switch cabinet racks adjoin each other, and wherein the switch cabinet racks each have a mounting side which lie in a second common plane and face an interior space of each of the interconnected switch cabinet racks, the first and the second plane extending parallel to one another and being spaced apart from one another, wherein the baying connector is completely arranged between the first and the second plane, wherein the baying connector has a body with opposite contact sides, with which the body rests against a further profile side each, which extends between the first and second planes and perpendicular to them, wherein at least one latching projection extends from at least one of the contact sides through a fastening aperture in one of the further profile sides and latches the baying connector to the further profile side.

2. The arrangement according to claim 1, in which at least one screw passage extends over an entire length of the baying connector between the contact sides and through the contact sides.

3. The arrangement according to claim 2, in which the at least one screw passage being aligned with the at least one latching projection and continued through the latching projection.

4. The arrangement according to claim 2, in which a screw bolt is passed through a closed profile section of the switch cabinet rack from an outer profile side which is arranged parallel to and spaced apart from the further profile side.

5. The arrangement according to claim 4, in which the screw bolt enters the closed profile section via the outer profile side and exits the closed profile section via the further profile side and enters the baying connector via one of the opposite contact sides of the baying connector.

6. The arrangement according to claim 5, in which the screw bolt has an external thread at least in an end section facing away from a head of the screw bolt, with which the screw bolt is screwed into an internal thread of the at least one screw passage.

7. The arrangement according to claim 4, in which the screw bolt bears against the outer profile side with a head of the screw bolt.

8. The arrangement according to claim 1, in which a centering pin extends from at least another one of the contact sides and perpendicular to the at least another one of the contact sides.

9. The arrangement according to claim 1, in which the at least one latching projection has a sliding surface which extends from the at least one of the contact sides and perpendicularly to the at least one of the contact sides and which is arranged opposite a hook of the latching projection, the sliding surface bearing form-fittingly against an edge of the fastening aperture through which the latching projection extends.

10. The arrangement according to claim 1, in which the baying connector has a mounting plane with a row of equidistantly spaced fastening apertures lying in the second common plane of the mounting sides.

11. The arrangement according to claim 10, in which the fastening apertures have a distance to each other which corresponds to a grid dimension of a system perforation of the switch cabinet rack.

12. The arrangement according to claim 11, in which the fastening apertures of the baying connector are arranged along a linear row of holes and are formed identical to fastening apertures of the system perforation, wherein the fastening apertures of the baying connector and at least one identical fastening aperture of the system perforation are arranged along a straight line, a distance between each of the fastening apertures of the baying connector and the at least one fastening aperture of the system perforation being an integer multiple of the grid dimension.

13. The arrangement according to claim 1, in which the profile webs adjoin each other under formation of a sealing gap and are formed as identical sealing webs widening towards a free end of each of the identical sealing webs, wherein a push-on seal is pushed onto one of the sealing webs, which push-on seal seals the sealing gap fluid-tight.

14. The arrangement according to claim 13, in which the contact sides of the baying connector have a spacing that is slightly greater than a sum of a length of the profile webs, wherein the push-on seal has a defined compression when the further profile sides abut the opposite contact sides of the baying connector.

* * * * *